United States Patent
Yamazaki (10) Patent No.: US 12,057,987 B2
(45) Date of Patent: Aug. 6, 2024

(54) CORRECTION CIRCUIT AND CORRECTION METHOD

(71) Applicant: LAPIS Technology Co., Ltd., Yokohama (JP)

(72) Inventor: Masato Yamazaki, Yokohama (JP)

(73) Assignee: LAPIS TECHNOLOGY CO., LTD., Yokohama (JP)

(*) Notice: Subject to any disclaimer, the term of this patent is extended or adjusted under 35 U.S.C. 154(b) by 62 days.

(21) Appl. No.: 17/994,172

(22) Filed: Nov. 25, 2022

(65) Prior Publication Data
US 2023/0171143 A1 Jun. 1, 2023

(30) Foreign Application Priority Data
Nov. 29, 2021 (JP) .................................. 2021-193549

(51) Int. Cl.
*H04L 27/34* (2006.01)
(52) U.S. Cl.
CPC ............................... *H04L 27/3405* (2013.01)
(58) Field of Classification Search
CPC ... H03H 7/30; H03H 7/40; H04B 1/04; H04B 1/38; H04B 10/04; H04B 10/516; H04B 17/11; H04B 17/21; H04L 1/24; H04L 5/16; H04L 25/03; H04L 27/12; H04L 27/20; H04L 27/22; H04L 27/34; H04L 27/36; H04L 27/3045
USPC ....... 375/219, 235, 260, 261, 295, 302, 316, 375/317, 332, 343
See application file for complete search history.

(56) References Cited

U.S. PATENT DOCUMENTS

| | | | |
|---|---|---|---|
| 6,377,620 B1 | 4/2002 | Ozluturk et al. | |
| 9,780,891 B2* | 10/2017 | Eo | H04B 17/0085 |
| 2002/0110201 A1 | 8/2002 | Ozluturk et al. | |
| 2005/0213691 A1 | 9/2005 | Ozluturk et al. | |
| 2007/0211824 A1* | 9/2007 | Yamazaki | H04L 27/36 375/302 |
| 2007/0280380 A1* | 12/2007 | Cho | H04L 27/364 375/332 |
| 2009/0141788 A1 | 6/2009 | Ozluturk et al. | |
| 2011/0013724 A1* | 1/2011 | Metreaud | H04L 27/3863 375/345 |

FOREIGN PATENT DOCUMENTS

JP  2010226756 A  10/2010

* cited by examiner

*Primary Examiner* — Shawkat M Ali
(74) *Attorney, Agent, or Firm* — Rabin & Berdo. P.C.

(57) ABSTRACT

A correction circuit including: a first selector and a second selector that each select and output either of a first input signal or a second input signal, the first input signal and the second input signal having phases that are orthogonal to one another; a first multiplier carrying out multiplication of an output of the first selector and a first coefficient; a second multiplier carrying out multiplication of an output of the second selector and a second coefficient; a first adder carrying out addition of the first input signal and a multiplication result of the first multiplier; and a second adder carrying out addition of the second input signal and a multiplication result of the second multiplier, wherein an addition result of the first adder and an addition result of the second adder are outputted from a first output terminal and a second output terminal, respectively.

7 Claims, 4 Drawing Sheets

RELATED ART

CORRECTION CIRCUIT AND CORRECTION METHOD

CROSS-REFERENCE TO RELATED APPLICATION

This application claims priority under 35 USC 119 from Japanese Patent Application No. 2021-193549, filed on Nov. 29, 2021, the disclosure of which is incorporated by reference herein.

BACKGROUND

Technical Field

The present disclosure relates to a correction circuit and a correction method that make waveforms of input signals approach target waveforms.

Related Art

Japanese Patent Application Laid-Open (JP-A) No. 2010-226756, discloses a system that balances the respective amplitudes and phases of the I channel and the Q channel of a quadrature-phase modulated signal.

A communication device, which carries out communication by using two modulated signals that are an I channel signal and a Q channel signal whose phases are orthogonal to one another, has a quadrature modulator and a quadrature demodulator for carrying out modulation and demodulation of the signals. Analog elements such as resistors and capacitors for example are used in the quadrature modulator and the quadrature demodulator. Due to dispersion in characteristics of analog elements, there are cases in which a difference arises in the respective amplitudes of the I channel signal and the Q channel signal which would ideally have amplitudes of the same magnitudes, and the phase difference between the I channel signal and the Q channel signal, which would ideally have a phase difference of 90°, is offset from 90°. The gain error arising from this difference in amplitudes, and the phase error arising from this phase offset, adversely affect the communication performance of the communication device.

Accordingly, there are cases in which a quadrature error correction circuit 100, which corrects the amplitudes and phase difference of an I channel signal and a Q channel signal, is used.

Figure 4:
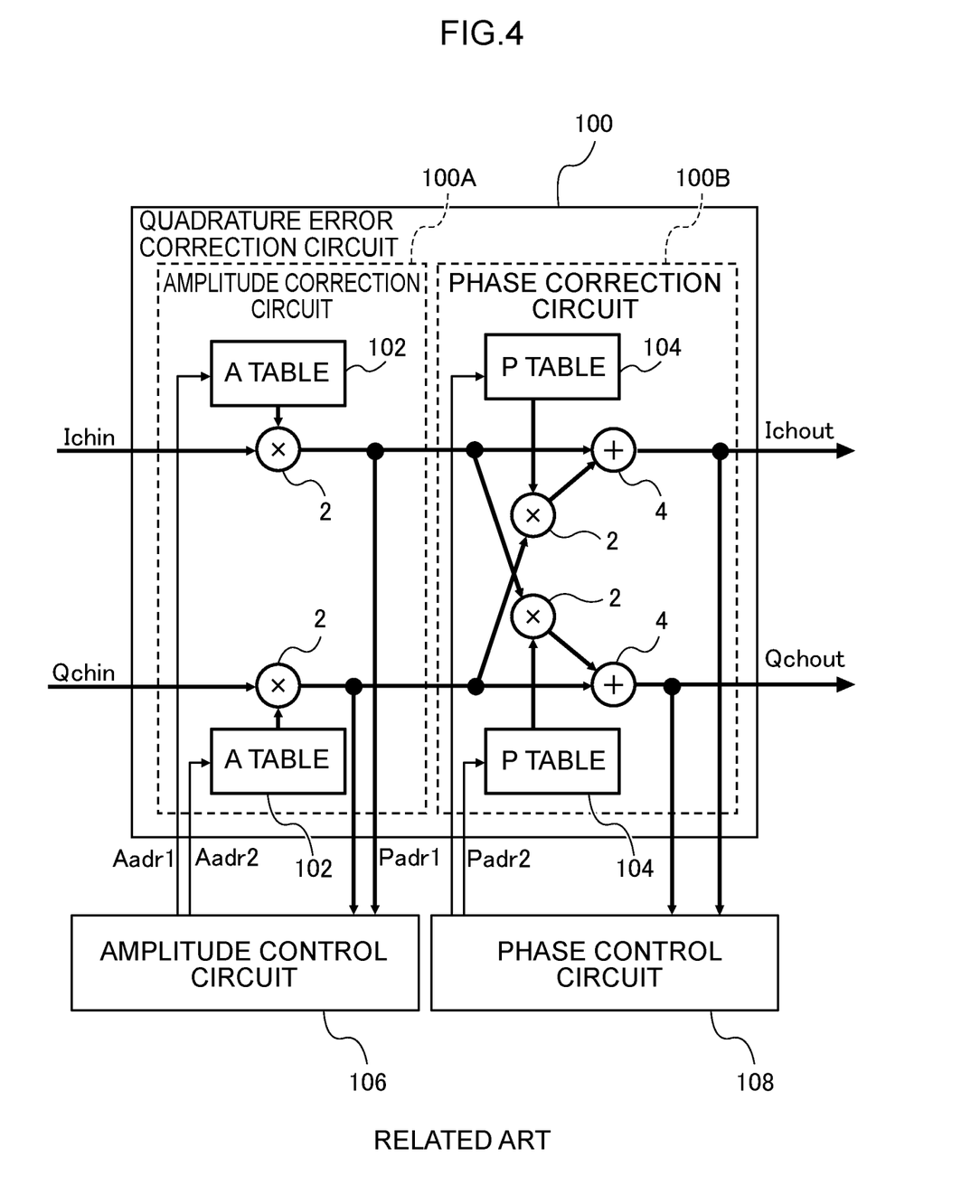
FIG. 4 is a drawing illustrating an example of a conventional quadrature error correction circuit.

FIG. 4 is a drawing illustrating an example of the conventional quadrature error correction circuit 100. As illustrated in FIG. 4, the quadrature error correction circuit 100 includes an amplitude correction circuit 100A and a phase correction circuit 100B.

The amplitude correction circuit 100A includes two multipliers 2 and an amplitude correction table 102 (also called "A table 102"). The output signals of the respective multipliers 2, which are the output signals of the amplitude correction circuit 100A, are fed-back to an amplitude control circuit 106. The amplitude control circuit 106 selects, from the A table 102, correction values corresponding to the difference between the fed-back amplitudes such that the difference between the amplitudes of the output signals of the respective multipliers 2 approaches "0", and inputs the correction values to the respective multipliers 2. Due thereto, an I channel input signal (abbreviated as "Ich in" upon occasion) and a Q channel input signal (abbreviated as "Qch in" upon occasion) are multiplied by the respective selected correction values by the two multipliers 2, and the I channel input signal and the Q channel input signal, which are corrected such that the difference in the amplitudes approaches "0", are inputted to the phase correction circuit 100B.

On the other hand, the phase correction circuit 100B includes the two multipliers 2, two adders 4, and a phase correction table 104 (also called "P table 104"). The output signals of the respective adders 4, which are the output signals of the phase correction circuit 100B, are fed-back to a phase control circuit 108. The phase control circuit 108 selects, from the P table 104, correction values corresponding to the phase difference of the fed-back output signals such that the phase difference of the output signals of the respective adders 4 approaches 90°, and inputs the correction values to the respective multipliers 2. Due thereto, the I channel input signal and the Q channel input signal are multiplied by the respective selected correction values by the two multipliers 2. At the adder 4, the phase correction circuit 100B adds the Q channel input signal, which was outputted from the amplitude correction circuit 100A, to the result of multiplication of the correction value and the I channel input signal that was outputted from the amplitude correction circuit 100A, and thereby outputs a Q channel output signal (abbreviated as "Qch out" upon occasion) that is corrected such that the phase difference with the I channel input signal approaches 90°. Further, at the adder 4, the phase correction circuit 100B adds the I channel input signal, which was outputted from the amplitude correction circuit 100A, to the result of multiplication of the correction value with the Q channel input signal that was outputted from the amplitude correction circuit 100A, and thereby outputs an I channel output signal (abbreviated as "Ich out" upon occasion) that is corrected such that the phase difference with the Q channel input signal approaches 90°.

However, at the quadrature error correction circuit 100 illustrated in FIG. 4, the amplitude correction circuit 100A and the phase correction circuit 100B are divided functionally. Therefore, the multipliers 2 that are respectively included in the amplitude correction circuit 100A and the phase correction circuit 100B cannot be used in common, and the multipliers 2 are needed at the amplitude correction circuit 100A and the phase correction circuit 100B respectively. Moreover, control circuits (in this case, the amplitude control circuit 106 and the phase control circuit 108) are needed at the amplitude correction circuit 100A and the phase correction circuit 100B respectively.

SUMMARY

The present disclosure provides a correction circuit and a correction method that may correct at least one of the amplitudes and the phase difference of two input signals by using common elements, without structuring the correction circuit to be divided into a circuit that corrects the amplitudes and a circuit that corrects the phase difference.

A first aspect of the present disclosure is a correction circuit including: a first selector and a second selector that each select and output either of a first input signal or a second input signal, the first input signal and the second input signal having phases that are orthogonal to one another; a first multiplier carrying out multiplication of an output of the first selector and a first coefficient; a second multiplier carrying out multiplication of an output of the second selector and a second coefficient; a first adder carrying out addition of the first input signal and a multiplication result of the first multiplier; and a second adder carrying out addition of the second input signal and a multiplication result of the second multiplier, wherein an addition result of the first adder and an addition result of the second adder are outputted from a first output terminal and a second output terminal, respectively.

A second aspect of the present disclosure is a correction method including, by a control circuit: controlling a first selector and a second selector, and respectively selecting either input signal among a first input signal and a second input signal whose phases are orthogonal to one another; executing multiplication of a preset first coefficient and output of the first selector by using a first multiplier, and executing multiplication of a preset second coefficient and output of the second selector by using a second multiplier; and outputting a first addition result of the first input signal and a multiplication result of the first multiplier, the first addition result being obtained by using a first adder, and outputting a second addition result of the second input signal and a multiplication result of the second multiplier, the second addition result being obtained by using a second adder, as a correction signal of the first input signal and a correction signal of the second input signal, respectively.

In accordance with the present disclosure, there is the effect that at least one of the amplitudes and the phase difference of two input signals can be corrected by using common elements, without structuring the correction circuit to be divided into a circuit that corrects the amplitudes and a circuit that corrects the phase difference.

BRIEF DESCRIPTION OF THE DRAWINGS

Exemplary embodiments will be described in detail based on the following figures, wherein.

DETAILED DESCRIPTION

Embodiments are described hereinafter with reference to the drawings. Note that structural elements that are the same are denoted by the same reference numerals throughout all of the drawings, and repeat description thereof is omitted. In the present embodiments, the multiplication of numerical value a and numerical value b is expressed as "ab", but where the operational relationships are unclear, there are cases in which it is expressed as "a·b" in order to clarify that it is the multiplication of numerical value a and numerical value b.

<Principles of Correction>

The I channel input signal is expressed as cosine waveform A cos θ, and the Q channel input signal whose phase is orthogonal to the I channel input signal is expressed as sine waveform B sin θ. Here, "A" is the amplitude of the I channel input signal, "B" is the amplitude of the Q channel input signal, and "θ" is the phase angle.

A case in which amplitude A of the I channel input signal is corrected to B cos θ so as to conform with amplitude B of the Q channel input signal is considered. In this case, B cos θ is transformed as per formula (1).

$$B \cos\theta = A\cos\theta - A\cos\theta + B\cos\theta \quad (1)$$
$$= A\cos\theta + (B/A - 1)A\cos\theta$$

Accordingly, it can be understood that, in order to obtain B cos θ, it suffices to add I channel input signal A cos θ to the result of multiplying the I channel input signal A cos θ by coefficient (B/A−1).

On the other hand, when considering a case in which amplitude B of the Q channel input signal is corrected to A sin θ so as to conform with amplitude A of the I channel input signal, A sin θ is transformed as per formula (2).

$$A\sin\theta = B\sin\theta - B\sin\theta + A\sin\theta \quad (2)$$
$$= B\sin\theta + (A/B - 1)B\sin\theta$$

Accordingly, it can be understood that, in order to obtain A sin θ, it suffices to add Q channel input signal B sin θ to the result of multiplying the Q channel input signal B sin θ by coefficient (A/B−1).

Next, a case is considered in which amplitude A of the I channel input signal and amplitude B of the Q channel input signal are equal, but the phase of the Q channel input signal is offset by phase angle α with respect to the I channel input signal. In this case, if amplitude A and amplitude B are made to be "1", the I channel input signal is expressed as cos θ, and the Q channel input signal is expressed as sin(θ+α). Applying the addition theorem, sin(θ+α) is transformed as per formula (3).

$$\sin(\theta+\alpha) = \sin\theta\cos\alpha + \cos\theta\sin\alpha \quad (3)$$

In a case in which the phase angle α is small to the extent that it can be considered to be "0", cos α can be considered to be "1". Accordingly, formula (3) is expressed as per formula (4).

$$\sin(\theta+\alpha) = \sin\theta + \cos\theta\sin\alpha \quad (4)$$

If formula (4) is transformed with respect to sin θ, formula (5) is obtained.

$$\sin\theta = \sin(\theta+\alpha) - \cos\theta\sin\alpha \quad (5)$$

Although amplitude A and amplitude B are respectively considered to be "1" in the above description, in a case in which amplitude A and amplitude B are different, the I channel input signal is expressed as A cos θ, and the Q channel input signal is expressed as B sin(θ+α). If both sides of formula (5) are multiplied by amplitude B, formula (6) is obtained.

$$B\sin\theta = B\sin(\theta+\alpha) - B\cos\theta\sin\alpha \quad (6)$$

If formula (6) is transformed by replacing the B cos θ in formula (6) with formula (1), formula (7) is obtained.

$$B\sin\theta = B\sin(\theta+\alpha) - (B/A)\sin\alpha \cdot A\cos\theta \quad (7)$$

Accordingly, it can be understood that, in a case in which the phase of the Q channel input signal is made to conform with the phase of the I channel input signal, i.e., in a case in which the phase of the Q channel input signal is corrected by using the I channel input signal as the standard, it suffices to detect the phase angle α and the amplitudes A and B, and to subtract the result of multiplying the I channel input signal A cos θ by (B/A)sin α, from the Q channel input signal B sin(θ+α).

On the other hand, a case of correction that makes the phase of the I channel input signal conform with the phase of the Q channel input signal, i.e., of correcting the phase of the I channel input signal by using the Q channel input signal as the standard, is described.

In the same way as when correcting the phase of the Q channel input signal by using the I channel input signal as the standard, first, a case is considered in which amplitude A of the I channel input signal and amplitude B of the Q channel input signal are both "1", and the phase of the I channel input signal is offset by phase angle $\alpha$ with respect to the Q channel input signal. In this case, the I channel input signal is expressed as $\cos(\theta+\alpha)$ and the Q channel input signal is expressed as $\sin\theta$. Applying the addition theorem, $\cos(\theta+\alpha)$ is transformed as per formula (8).

$$\cos(\theta+\alpha)=\cos\theta\cos\alpha-\sin\theta\sin\alpha \quad (8)$$

In a case in which the phase angle $\alpha$ is small to the extent that it can be considered to be "0", $\cos\alpha$ can be considered to be "1". Accordingly, formula (8) is expressed as per formula (9).

$$\cos(\theta+\alpha)=\cos\theta-\sin\theta\sin\alpha \quad (9)$$

If formula (9) is transformed with respect to $\cos\theta$, formula (10) is obtained.

$$\cos\theta=\cos(\theta+\alpha)+\sin\theta\sin\alpha \quad (10)$$

Although amplitude A and amplitude B are respectively considered to be "1" in the above description, in a case in which amplitude A and amplitude B are different, the I channel input signal is expressed as $A\cos(\theta+\alpha)$, and the Q channel input signal is expressed as $B\sin\theta$. If both sides of formula (10) are multiplied by amplitude A, formula (11) is obtained.

(Numerical Expression 11)

$$A\cos\theta=A\cos(\theta+\alpha)+A\sin\theta\sin\alpha \quad (11)$$

If formula (11) is transformed by replacing the $A\sin\theta$ in formula (11) with formula (2), formula (12) is obtained.

$$A\cos\theta=A\cos(\theta+\alpha)+(A/B)\sin\alpha\cdot B\sin\theta \quad (12)$$

Accordingly, it can be understood that, in a case in which the phase of the I channel input signal is corrected by using the Q channel input signal as the standard, it suffices to detect the phase angle $\alpha$ and the amplitudes A and B, and to add the result of multiplying the Q channel input signal $B\sin\theta$ by $(A/B)\sin\alpha$, to the I channel input signal $A\cos(\theta+\alpha)$.

Formula (1) and formula (2) are correction formulas that make amplitude A of the I channel input signal and amplitude B of the Q channel input signal the same. Formula (7) and formula (12) are correction formulas that make the phase of the Q channel input signal conform with the phase of the I channel input signal. Accordingly, by combining formula (1), formula (2), formula (7) and formula (12), amplitude correction and phase correction can be carried out simultaneously on the I channel input signal and the Q channel input signal, respectively.

Specifically, in a case of generating Q channel input signal $A\sin\theta$ in which amplitude B of the Q channel input signal is made to conform with amplitude A of the I channel input signal, and I channel input signal $A\cos\theta$ in which the phase of the I channel input signal is corrected by using the Q channel input signal as the standard, it suffices to use formula (2) and formula (12).

Further, in a case of generating I channel input signal $B\cos\theta$ in which amplitude A of the I channel input signal is made to conform with amplitude B of the Q channel input signal, and Q channel input signal $B\sin\theta$ in which the phase of the Q channel input signal is corrected by using the I channel input signal as the standard, it suffices to use formula (1) and formula (7).

<Structure of Correction Circuit>

Figure 1:
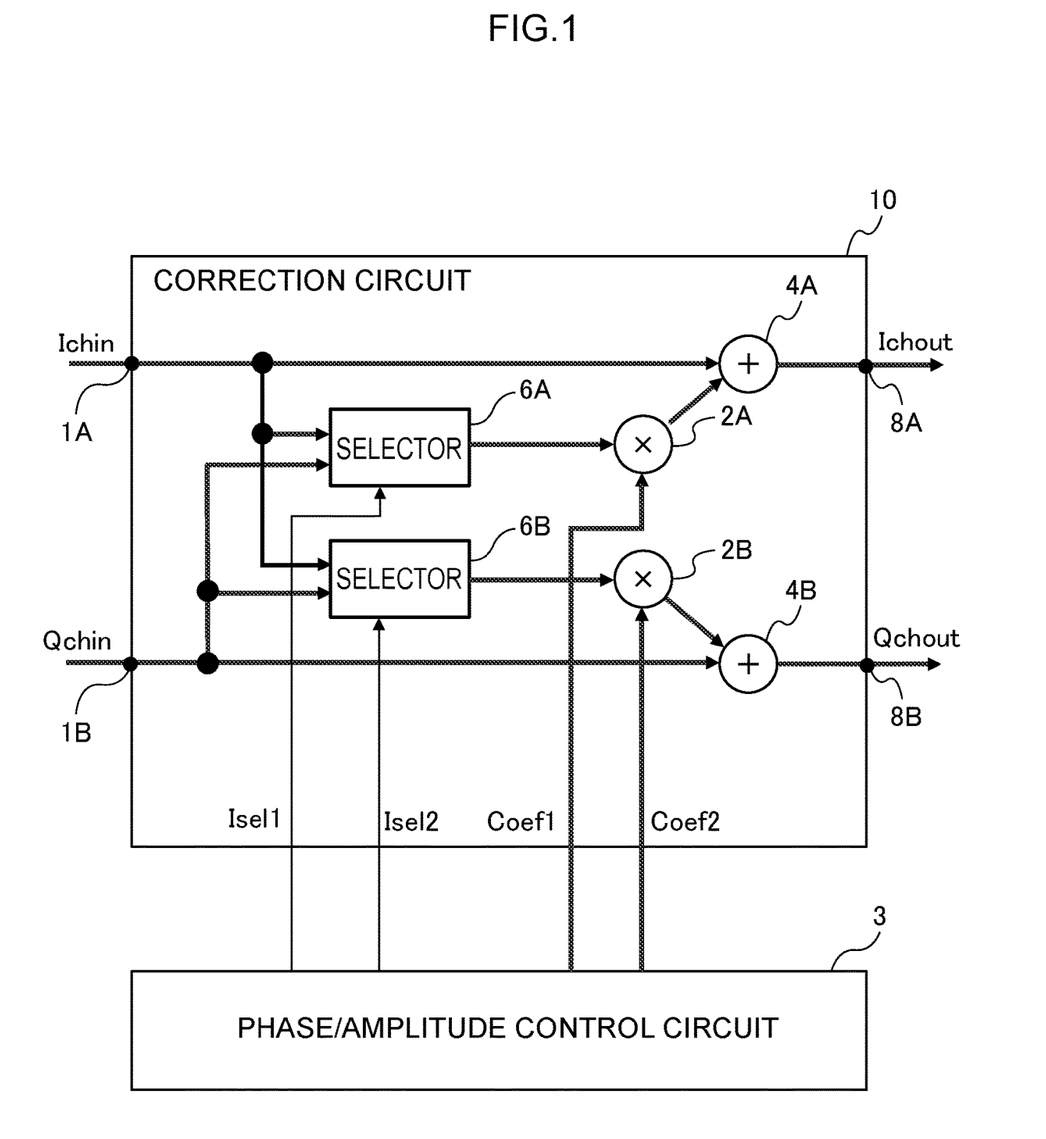
FIG. 1 is a drawing illustrating an example of a correction circuit.

FIG. 1 is a drawing illustrating an example of a correction circuit 10 that realizes calculation in accordance with the respective correction formulas expressed by formula (1), formula (2), formula (7) and formula (12).

The correction circuit 10 has two multipliers 2A, 2B, two adders 4A, 4B and two selectors 6A, 6B, and carries out amplitude correction and phase correction on an I channel input signal inputted from input terminal 1A and a Q channel input signal inputted from input terminal 1B, and outputs the corrected I channel input signal and the corrected Q channel input signal from output terminal 8A and output terminal 8B, respectively.

The input terminal 1A of the I channel input signal is connected to inputs of the selector 6A and the selector 6B, and is connected to one input of the adder 4A. The input terminal 1B of the Q channel input signal is connected to inputs of the selector 6A and the selector 6B, and is connected to one input of the adder 4B.

The output of the selector 6A is connected to one of the inputs of the multiplier 2A, and a phase/amplitude control circuit 3 is connected to the another input of the multiplier 2A. The phase/amplitude control circuit 3 is an example of the control circuit relating to the present embodiment. A first coefficient, which is expressed by output signal Coef1 and is outputted from the phase/amplitude control circuit 3, is inputted to the another input of the multiplier 2A.

The output of the selector 6B is connected to one of the inputs of the multiplier 2B, and the phase/amplitude control circuit 3 is connected to the another input of the multiplier 2B. A second coefficient, which is expressed by output signal Coef2 and is outputted from the phase/amplitude control circuit 3, is inputted to the another input of the multiplier 2B.

The output of the multiplier 2A is connected to the another input of the adder 4A, and the output of the adder 4A is connected to the output terminal 8A. Further, the output of the multiplier 2B is connected to the another input of the adder 4B, and the output of the adder 4B is connected to the output terminal 8B.

In accordance with the contents of selection signal Isel1 that is outputted from the phase/amplitude control circuit 3, the selector 6A selects and outputs either one of the I channel input signal and the Q channel input signal that are inputted to the selector 6A. Similarly, in accordance with the contents of selection signal Isel2 that is outputted from the phase/amplitude control circuit 3, the selector 6B selects and outputs either one of the I channel input signal and the Q channel input signal that are inputted to the selector 6B.

Note that the I channel input signal is an example of the "first input signal" relating to the present embodiment, and the Q channel input signal is an example of the "second input signal" relating to the present embodiment.

The selector 6A and the selector 6B, which select and output either of the I channel input signal and the Q channel input signal, are examples of the "first selector" and the "second selector" relating to the present embodiment, respectively.

The multiplier 2A, which multiplies the output of the selector 6A and the first coefficient, is an example of the "first multiplier" relating to the present embodiment. The multiplier 2B, which multiplies the output of the selector 6B and the second coefficient, is an example of the "second multiplier" relating to the present embodiment.

The adder 4A which adds the multiplication result of the multiplier 2A and the I channel input signal, is an example of the "first adder" relating to the present embodiment. The adder 4B which adds the multiplication result of the multiplier 2B and the Q channel input signal, is an example of the "second adder" relating to the present embodiment.

Further, the output terminal 8A, which outputs the result of adding at the adder 4A, is an example of the "first output terminal" relating to the present embodiment. The output terminal 8B, which outputs the result of adding at the adder 4B, is an example of the "second output terminal" relating to the present embodiment.

<Operation of Correction Circuit>

Operation of the correction circuit 10 is described with reference to FIG. 1.

First, description is given of an example of operation (called "Operation Example A") in which, in a case in which A $\cos(\theta+\alpha)$ is inputted to the input terminal 1A of the correction circuit 10 as the I channel input signal, and B $\sin\theta$ is inputted to the input terminal 1B of the correction circuit 10 as the Q channel input signal, the correction circuit 10 generates corrected Q channel input signal A $\sin\theta$ that is corrected such that amplitude B of the Q channel input signal becomes equal to amplitude A of the I channel input signal, and generates corrected I channel input signal A $\cos\theta$ that is corrected such that the phase of the I channel input signal becomes equal to the phase of the Q channel input signal.

In this case, at the correction circuit 10, it suffices to carry out calculation of the respective correction formulas expressed by formula (2) and formula (12). To this end, the phase/amplitude control circuit 3 carries out control such that the selector 6A selects the Q channel input signal by the selection signal Isel1. Due thereto, B $\sin\theta$ is inputted to the multiplier 2A. Further, the phase/amplitude control circuit 3 carries out control such that the selector 6B selects the Q channel input signal by the selection signal Isel2. Due thereto, B $\sin\theta$ is inputted to the multiplier 2B as well.

Moreover, the phase/amplitude control circuit 3 sets the first coefficient to the value of (A/B)sin α, and outputs the output signal Coef1 expressing the first coefficient to the input of the multiplier 2A. Due thereto, multiplication of (A/B)sin α and B $\sin\theta$ is carried out at the multiplier 2A, and the multiplication result (A/B)sin α·B $\sin\theta$ is outputted from the multiplier 2A and inputted to the adder 4A.

Accordingly, at the adder 4A, addition of the multiplication result (A/B)sin α·B $\sin\theta$ and the I channel input signal A $\cos(\theta+\alpha)$ is carried out, and the addition result {A $\cos(\theta+\alpha)$+(A/B)sin α·B $\sin\theta$} is outputted from the output terminal 8A. The output signal outputted from the output terminal 8A is cosine waveform A $\cos\theta$ expressed by formula (12), i.e., the corrected I channel input signal in which the phase of the I channel input signal is corrected by using the Q channel input signal as the standard.

Further, the phase/amplitude control circuit 3 sets the second coefficient to the value of (A/B−1), and outputs the output signal Coef2 expressing the second coefficient to the input of the multiplier 2B. Due thereto, multiplication of (A/B−1) and B $\sin\theta$ is carried out at the multiplier 2B, and the multiplication result (A/B−1)B $\sin\theta$ is outputted from the multiplier 2B and inputted to the adder 4B.

Accordingly, at the adder 4B, addition of the multiplication result (A/B−1)B $\sin\theta$ and the Q channel input signal B $\sin\theta$ is carried out, and the addition result {B $\sin\theta$+(A/B−1)B $\sin\theta$} is outputted from the output terminal 8B. The output signal outputted from the output terminal 8B is sine waveform A $\sin\theta$ expressed by formula (2), i.e., the corrected Q channel input signal that is corrected such that amplitude B of the Q channel input signal becomes equal to amplitude A of the I channel input signal.

Next, description is given of an example of operation (called "Operation Example B") in which, in a case in which A $\cos\theta$ is inputted to the input terminal 1A of the correction circuit 10 as the I channel input signal, and B $\sin(\theta+\alpha)$ is inputted to the input terminal 1B of the correction circuit 10 as the Q channel input signal, the correction circuit 10 generates corrected I channel input signal B $\cos\theta$ that is corrected such that amplitude A of the I channel input signal becomes equal to amplitude B of the Q channel input signal, and generates corrected Q channel input signal B $\sin\theta$ that is corrected such that the phase of the Q channel input signal becomes equal to the phase of the I channel input signal.

In this case, at the correction circuit 10, it suffices to carry out calculation of the respective correction formulas expressed by formula (1) and formula (7). To this end, the phase/amplitude control circuit 3 carries out control such that the selector 6A selects the I channel input signal by the selection signal Isel1. Due thereto, A $\cos\theta$ is inputted to the multiplier 2A. Further, the phase/amplitude control circuit 3 carries out control such that the selector 6B selects the I channel input signal by the selection signal Isel2. Due thereto, A $\cos\theta$ is inputted to the multiplier 2B as well.

Moreover, the phase/amplitude control circuit 3 sets the first coefficient to the value of (B/A−1), and outputs the output signal Coef1 expressing the first coefficient to the input of the multiplier 2A. Due thereto, multiplication of (B/A−1) and A $\cos\theta$ is carried out at the multiplier 2A, and the multiplication result (B/A−1)A $\cos\theta$ is outputted from the multiplier 2A and inputted to the adder 4A.

Accordingly, at the adder 4A, addition of the multiplication result (B/A−1)A $\cos\theta$ and the I channel input signal A $\cos\theta$ is carried out, and the addition result {A $\cos\theta$+(B/A−1)A $\cos\theta$} is outputted from the output terminal 8A. The output signal outputted from the output terminal 8A is cosine waveform B $\cos\theta$ expressed by formula (1), i.e., the corrected I channel input signal that is corrected such that amplitude A of the I channel input signal becomes equal to amplitude B of the Q channel input signal.

Further, the phase/amplitude control circuit 3 sets the second coefficient to the value of "−(B/A)sin α", and outputs the output signal Coef2 expressing the second coefficient to the input of the multiplier 2B. Due thereto, multiplication of "−(B/A)sin α" and A $\cos\theta$ is carried out at the multiplier 2B, and the multiplication result "−(B/A)sin α·A $\cos\theta$" is outputted from the multiplier 2B and inputted to the adder 4B.

Accordingly, at the adder 4B, addition of the multiplication result "−(B/A)sin α·A $\cos\theta$" and the Q channel input signal B $\sin(\theta+\alpha)$ is carried out, and the addition result {B $\sin(\theta+\alpha)$−(B/A)sin α·A $\cos\theta$} is outputted from the output terminal 8B. The output signal outputted from the output terminal 8B is sine waveform B $\sin\theta$ expressed by formula (7), i.e., the corrected Q channel input signal in which the phase of the Q channel input signal is corrected by using the I channel input signal as the standard.

Note that the phase/amplitude control circuit 3 stores the first coefficients and the second coefficients corresponding to Operation Example A and Operation Example B in advance, and sets the first coefficient and the second coefficient that correspond to the type of operation example that is to be executed, as the output signal Coef1 and the output signal Coef2.

The corrected I channel input signal and the corrected Q channel input signal on which amplitude correction and phase correction have been carried out are inputted from the output terminals 8A, 8B to an unillustrated circuit (e.g., a quadrature modulating circuit and a quadrature demodulating circuit) that is connected at the stage after the correction circuit 10. Accordingly, at the unillustrated circuit, the gain error that arises from the difference in the amplitudes of the two input signals, and the phase error that arises from the offset of the phases of the two input signals that are orthogonal to one another, are small as compared with a case in which the I channel signal and the Q channel signal are not corrected by the correction circuit 10.

Further, because the multipliers 2A, 2B are used in both amplitude correction and phase correction at the correction circuit 10, the number of multipliers can be made smaller than (specifically, can be made to be half) the number of the multipliers 2 in the conventional quadrature error correction circuit 100 illustrated in FIG. 4.

Note that, although the selectors 6A, 6B are added in the correction circuit 10, the selectors 6A, 6B are switches, and therefore, can be realized by simple structures as compared with the multipliers 2A, 2B. Accordingly, even if the selectors 6A, 6B, which do not exist in the conventional quadrature error correction circuit 100, are added to the correction circuit 10, the correction circuit 10 can be made to be more compact than the conventional quadrature error correction circuit 100.

Further, because the number of times of multiplication at the correction circuit 10 also can be made to be smaller than at the conventional quadrature error correction circuit 100, the electric power consumed by the correction circuit 10 can be reduced more than at the conventional quadrature error correction circuit 100.

Operation Example A and Operation Example B describe examples in which the output signal Coef1 and the output signal Coef2 are set by using the first coefficient and the second coefficient that are stored in advance in the phase/amplitude control circuit 3. However, the phase/amplitude control circuit 3 may calculate the first coefficient and the second coefficient by using values that are fed-back from the correction circuit 10, and may input the result of calculating the first coefficient and the second coefficient to the multipliers 2A, 2B of the correction circuit 10 as the output signal Coef1 and the output signal Coef2.

Figure 2:
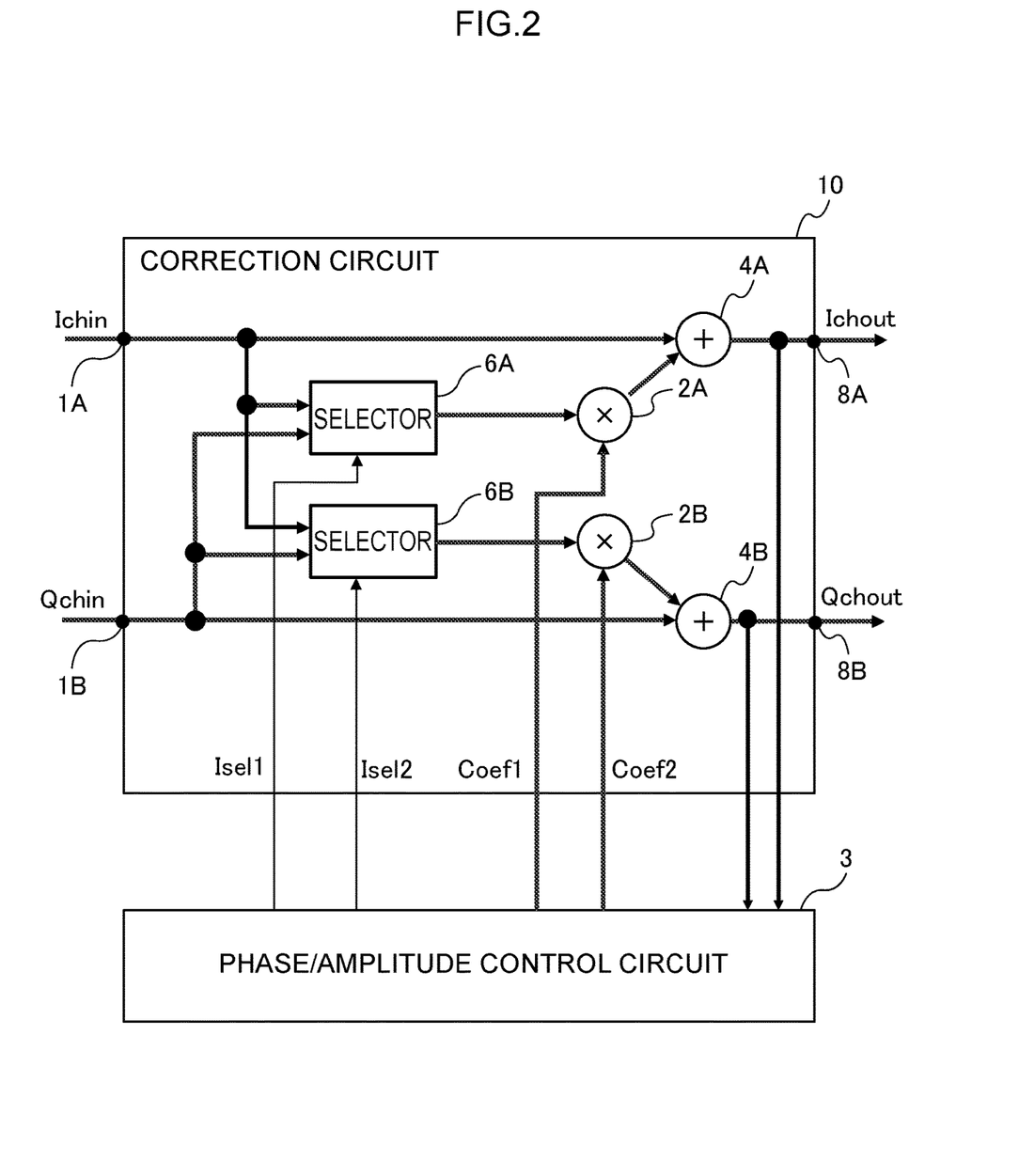
FIG. 2 is a drawing illustrating an example of the correction circuit that feeds-back outputs.

FIG. 2 is a drawing illustrating an example of the correction circuit 10 that feeds-back the respective outputs of the adders 4A, 4B to the phase/amplitude control circuit 3.

In Operation Example A, the phase/amplitude control circuit 3 sets the first coefficient and the second coefficient to be "0" respectively, in advance. Due thereto, the output signals Coef1, Coef2 that respectively express "0" are inputted to the multipliers 2A, 2B. Accordingly, the output of the adder 4A is the I channel input signal itself, and the output of the adder 4B is the Q channel input signal itself.

Due to feedback from the correction circuit 10, I channel input signal A cos(θ+α) and Q channel input signal B sin θ are inputted to the phase/amplitude control circuit 3. Therefore, by using, for example, the known techniques of a phase detecting circuit and an amplitude detecting circuit, the phase/amplitude control circuit 3 detects the amplitudes A, B and the phase angle α from A cos(θ+α) and B sin θ, and stores the detected amplitudes A, B and phase angle α.

Next, the phase/amplitude control circuit 3 carries out control such that the selector 6A selects the Q channel input signal by the selection signal Isel1. Further, the phase/amplitude control circuit 3 carries out control such that the selector 6B also selects the Q channel input signal by the selection signal Isel2.

On the other hand, by using the stored amplitudes A, B and phase angle α, the phase/amplitude control circuit 3 calculates (A/B)sin α as the first coefficient, and outputs the output signal Coef1 expressing the first coefficient to the input of the multiplier 2A. Due thereto, multiplication of (A/B)sin α and B sin θ is carried out at the multiplier 2A, and the multiplication result (A/B)sin α·B sin θ is outputted from the multiplier 2A and inputted to the adder 4A. Accordingly, the corrected I channel input signal (refer to formula (12)), in which the phase of the I channel input signal is corrected by using the Q channel input signal as the standard, is outputted from the output terminal 8A.

Further, by using the stored amplitudes A, B, the phase/amplitude control circuit 3 calculates (A/B−1) as the second coefficient, and outputs the output signal Coef2 expressing the second coefficient to the input of the multiplier 2B. Due thereto, multiplication of (A/B−1) and B sin θ is carried out at the multiplier 2B, and the multiplication result (A/B−1)B sin θ is outputted from the multiplier 2B and inputted to the adder 4B. Accordingly, the corrected Q channel input signal (refer to formula (2)), which is corrected such that amplitude B of the Q channel input signal becomes equal to amplitude A of the I channel input signal, is outputted from the output terminal 8B.

Similarly, in Operation Example B as well, the phase/amplitude control circuit 3 sets the first coefficient and the second coefficient to be "0" respectively, in advance. Due thereto, output signals Coef1, Coef2 that respectively express "0" are inputted to the multipliers 2A, 2B. Therefore, the output of the adder 4A is the I channel input signal itself, and the output of the adder 4B is the Q channel input signal itself.

Due to feedback from the correction circuit 10, I channel input signal A cos θ and Q channel input signal B sin(θ+α) are inputted to the phase/amplitude control circuit 3. Therefore, by using, for example, the known techniques of a phase detecting circuit and an amplitude detecting circuit, the phase/amplitude control circuit 3 detects the amplitudes A, B and the phase angle α from A cos θ and B sin(θ+α), and stores the detected amplitudes A, B and phase angle α.

Next, the phase/amplitude control circuit 3 carries out control such that the selector 6A selects the I channel input signal by the selection signal Isel1. Further, the phase/amplitude control circuit 3 carries out control such that the selector 6B also selects the I channel input signal by the selection signal Isel2.

On the other hand, by using the stored amplitudes A, B, the phase/amplitude control circuit 3 calculates (B/A−1) as the first coefficient, and outputs the output signal Coef1 expressing the first coefficient to the input of the multiplier 2A. Due thereto, multiplication of (B/A−1) and A cos θ is carried out at the multiplier 2A, and the multiplication result (B/A−1)A cos θ is outputted from the multiplier 2A and inputted to the adder 4A. Accordingly, the corrected I channel input signal (refer to formula (1)), which is corrected such that amplitude A of the I channel input signal becomes equal to amplitude B of the Q channel input signal, is outputted from the output terminal 8A.

Further, by using the stored amplitudes A, B and phase angle α, the phase/amplitude control circuit 3 calculates "−(B/A)sin α" as the second coefficient, and outputs the output signal Coef2 expressing the second coefficient to the input of the multiplier 2B. Due thereto, multiplication of "−(B/A)sin α" and A cos θ is carried out at the multiplier 2B, and the multiplication result "−(B/A)sin α·A cos θ" is outputted from the multiplier 2B and inputted to the adder 4B. Accordingly, the corrected Q channel input signal (refer to formula (7)), in which the phase of the Q channel input signal is corrected by using the I channel input signal as the standard, is outputted from the output terminal 8B.

Even in a situation in which the amplitudes A, B and the phase angle α are not known in advance, the amplitudes A, B and the phase angle α are obtained by feeding-back to the phase/amplitude control circuit 3 the respective outputs of the adders 4A, 4B in a case in which output signals Coef1, Coef2 respectively expressing "0" are outputted. Therefore, amplitude correction and phase correction can be carried out simultaneously by the correction circuit 10.

<Other Correction Examples of Correction Circuit>

Correction examples that carry out amplitude correction, which makes the amplitude of either one of the I channel input signal and the amplitude of the Q channel input signal conform with the amplitude of the another input signal, and carry out phase correction on the input signal on which amplitude correction was not carried out, have been described heretofore. However, the correction circuit 10 can also carry out amplitude correction or phase correction with respect to the input signals of both channels.

First, a correction example in which the respective amplitudes A, B of the I channel input signal and the Q channel input signal are corrected to a designated amplitude (called "amplitude C") is described.

Figure 3:
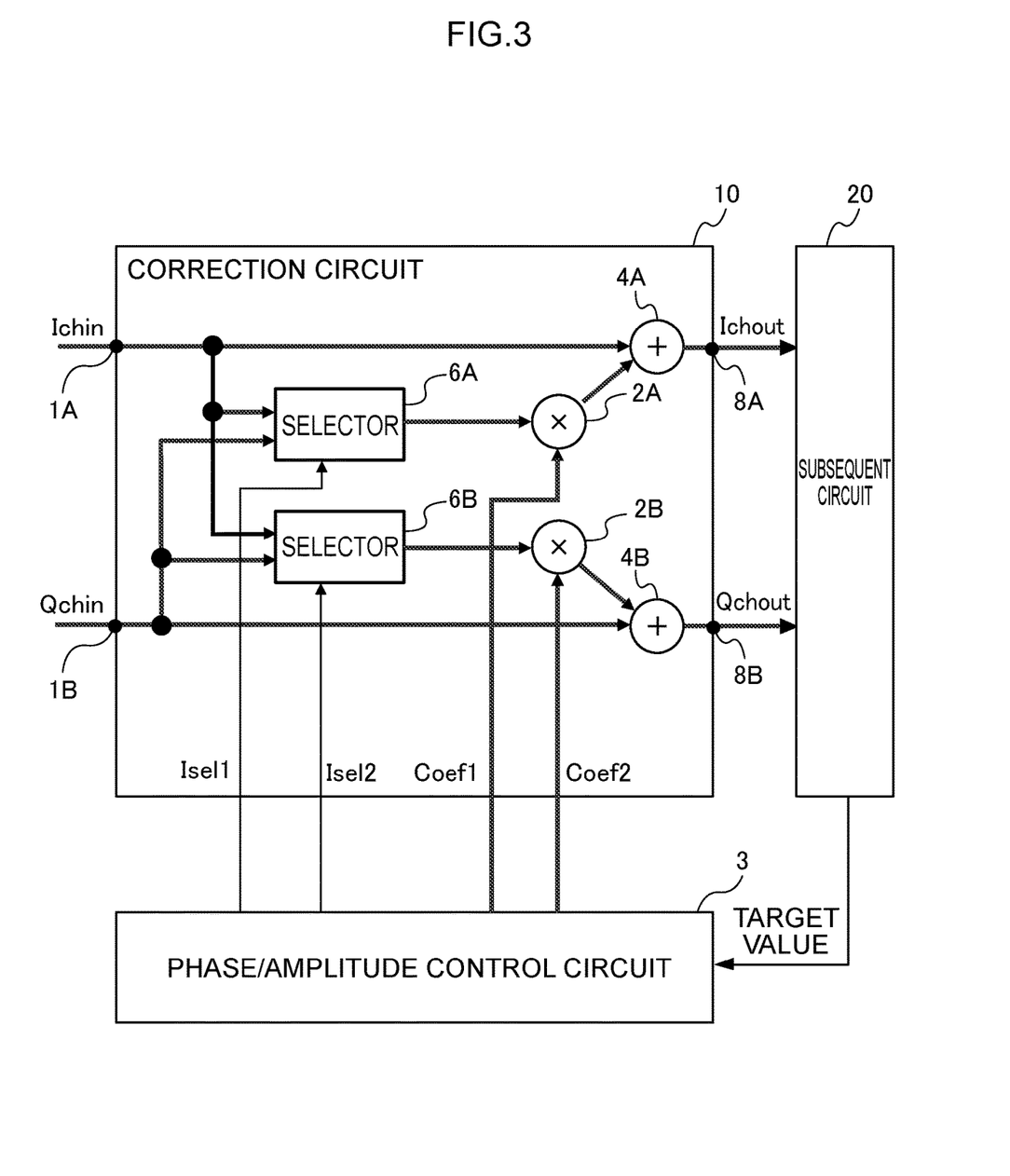
FIG. 3 is a drawing illustrating an example of the correction circuit that corrects amplitudes or phases of input signals to target values specified from a subsequent circuit.

FIG. 3 is a drawing illustrating an example of a circuit structure in which the output terminals 8A, 8B of the correction circuit 10 illustrated in FIG. 1 are connected to a subsequent circuit 20.

There are no limitations on the type of the subsequent circuit 20 that is connected at the stage after the correction circuit 10, provided that it is a circuit that carries out some type of processing by using input signals whose phases are orthogonal to one another. Here, as an example, it is assumed that processing that requires an I channel input signal and a Q channel input signal that both have amplitude C is carried out at the subsequent circuit 20.

Further, the subsequent circuit 20 is connected to the phase/amplitude control circuit 3 as well, and notifies the phase/amplitude control circuit 3 of the amplitude C of the corrected I channel input signal and the corrected Q channel input signal that are to be inputted to the subsequent circuit 20. Amplitude C that is notified from the subsequent circuit 20 is an example of the target value.

It is assumed that, in such a situation, A cos θ is inputted to the input terminal 1A of the correction circuit 10 as the I channel input signal, and B sin θ is inputted to the input terminal 1B of the correction circuit 10 as the Q channel input signal.

In this case, it suffices for the correction circuit 10 to correct the I channel input signal A cos θ to C cos θ and output it from the output terminal 8A, and to correct the Q channel input signal B sin θ to C sin θ and output it from the output terminal 8B.

When considering the expressions of C cos θ and C sin θ, C cos θ can be expressed as per formula (13), and C sin θ can be expressed as per formula (14). Expressing C cos θ by formula (13) and C sin θ by formula (14) is evident if the right sides of formula (13) and formula (14) are expanded.

$$C \cos θ = A \cos θ + (C/A - 1) A \cos θ \quad (13)$$

$$C \sin θ = B \sin θ + (C/B - 1) B \sin θ \quad (14)$$

Accordingly, it suffices for the correction circuit 10 to carry out calculation of the respective correction formulas expressed by formula (13) and formula (14). To this end, the phase/amplitude control circuit 3 effects control such that the selector 6A selects the I channel input signal by the selection signal Isel1. Due thereto, A cos θ is inputted to the multiplier 2A. Further, the phase/amplitude control circuit 3 effects control such that the selector 6B selects the Q channel input signal by the selection signal Isel2. Due thereto, B sin θ is inputted to the multiplier 2B.

Moreover, by using the amplitude C that is notified from the subsequent circuit 20, the phase/amplitude control circuit 3 sets the first coefficient to the value (C/A−1), and outputs the output signal Coef1 expressing the first coefficient to the input of the multiplier 2A. Due thereto, multiplication of (C/A−1) and A cos θ is carried out at the multiplier 2A, and the multiplication result (C/A−1)A cos θ is outputted from the multiplier 2A and inputted to the adder 4A.

Accordingly, addition of the multiplication result (C/A−1)A cos θ and the I channel input signal A cos θ is carried out at the adder 4A, and the addition result {A cos θ+(C/A−1)A cos θ} is outputted from the output terminal 8A. The correction signal outputted from the output terminal 8A is the cosine waveform C cos θ expressed by formula (13), i.e., is the corrected I channel input signal that is corrected such that amplitude A of the I channel input signal becomes amplitude C designated by the subsequent circuit 20.

Moreover, the phase/amplitude control circuit 3 sets the second coefficient to the value (C/B−1), and outputs the output signal Coef2 expressing the second coefficient to the input of the multiplier 2B. Due thereto, multiplication of (C/B−1) and B sin θ is carried out at the multiplier 2B, and the multiplication result (C/B−1)B sin θ is outputted from the multiplier 2B and inputted to the adder 4B.

Accordingly, addition of the multiplication result (C/B−1)B sin θ and the Q channel input signal B sin θ is carried out at the adder 4B, and the addition result {B sin θ+(C/B−1)B sin θ} is outputted from the output terminal 8B. The correction signal outputted from the output terminal 8B is the sine waveform C sin θ expressed by formula (14), i.e., is the corrected Q channel input signal that is corrected such that amplitude B of the Q channel input signal becomes amplitude C designated by the subsequent circuit 20.

Note that the amplitudes A, B that are used as the first coefficient and the second coefficient may be stored in advance in the phase/amplitude control circuit 3. Or, as illustrated in FIG. 2, the output signals of the adders 4A, 4B may be fed-back to the phase/amplitude control circuit 3, and the amplitudes A, B may be detected at the phase/amplitude control circuit 3 from the output signals of the adders 4A, 4B.

Next, a correction example in which the respective phase angles of the I channel input signal and the Q channel input signal are corrected to a designated phase angle θ is described.

It is assumed that an I channel input signal and a Q channel input signal that both have phase angle θ are needed in the processing of the subsequent circuit 20 of FIG. 3, and that cos(θ+ζ) is inputted to the input terminal 1A of the correction circuit 10 as the I channel input signal, and that sin(θ+δ) is inputted to the input terminal 1B of the correction circuit 10 as the Q channel input signal. The phase angles ζ, δ are both phase angles expressing amounts of offset with respect to phase angle θ.

Further, the subsequent circuit 20 notifies the phase/amplitude control circuit 3 of the phase angle θ of the corrected I channel input signal and the corrected Q channel input signal that are to be inputted to the subsequent circuit 20. The phase angle θ that is notified from the subsequent circuit 20 is an example of the target value.

In this case, it suffices for the correction circuit 10 to correct the I channel input signal cos(θ+ζ) to cos θ and output it from the output terminal 8A, and to correct the Q channel input signal sin(θ+δ) to sin θ and output it from the output terminal 8B.

When considering the calculation formulas of cos θ and sin θ, cos θ can be expressed as per formula (15), and sin θ can be expressed as per formula (16).

$$\cos\theta = \cos(\theta+\zeta) + \sin(\theta+\delta)\sin\zeta \quad (15)$$

$$\sin\theta = \sin(\theta+\delta) - \cos(\theta+\zeta)\sin\delta \quad (16)$$

This is because formula (17) is obtained if the addition theorem is applied to sin(θ+δ) in formula (15).

$$\cos\theta = \cos(\theta+\zeta) + \{\sin\theta\cos\delta + \cos\theta\sin\delta\}\sin\zeta \quad (17)$$

In a case in which the phase angle δ is small to the extent that it can be considered to be "0", cos δ can be considered to be "1". Accordingly, formula (17) is expressed as per formula (18).

$$\cos\theta = \cos(\theta+\zeta) + \{\sin\theta + \cos\theta\sin\delta\}\sin\zeta \quad (18)$$
$$= \cos(\theta+\zeta) + \sin\theta\sin\zeta + \cos\theta\sin\delta\sin\zeta$$
$$= \cos(\theta+\zeta) + \sin\theta\sin\zeta$$

Note that the calculation result sin δ·sin ζ is a sufficiently small value, and therefore can be considered to be "0". Namely, the term cos θ sin δ sin ζ also can be considered to be "0". Accordingly, in formula (18), the term cos θ sin δ sin ζ is eliminated.

Assuming that the addition theorem is applied to cos(θ+ζ) in formula (18), and the phase angle ζ is small to the extent that it can be considered to be "0", the result of calculation at the right side of formula (18) is cos θ. Because formula (18) is derived from formula (15), cosθ can be expressed as per formula (15).

Similarly, if the addition theorem is applied to cos(θ+ζ) in formula (16), formula (19) is obtained.

$$\sin\theta = \sin(\theta+\delta) - \{\cos\theta\cos\zeta - \sin\theta\sin\zeta\}\sin\delta \quad (19)$$

In a case in which the phase angle ζ is small to the extent that it can be considered to be "0", cos ζ can be considered to be "1". Accordingly, formula (19) is expressed as per formula (20).

$$\sin\theta = \sin(\theta+\delta) - \{\cos\theta - \sin\theta\sin\zeta\}\sin\delta \quad (20)$$
$$= \sin(\theta+\delta) - \cos\theta\sin\delta + \sin\theta\sin\zeta\sin\delta$$
$$= \sin(\theta+\delta) - \cos\theta\sin\delta$$

Note that the calculation result sin ζ·sin δ is a sufficiently small value, and therefore can be considered to be "0". Namely, the term sin θ sin ζ sin δ also can be considered to be "0". Accordingly, in formula (20), the term sin θ sin ζ sin δ is eliminated.

Assuming that the addition theorem is applied to sin(θ+ζ) in formula (20), and the phase angle δ is small to the extent that it can be considered to be "0", the result of calculation at the right side of formula (20) is sin θ. Because formula (20) is derived from formula (16), sin θ can be expressed as per formula (16).

Accordingly, it suffices for the correction circuit 10 to carry out calculation of the respective correction formulas expressed by formula (15) and formula (16). To this end, the phase/amplitude control circuit 3 effects control such that the selector 6A selects the Q channel input signal by the selection signal Isel1. Due thereto, sin(θ+δ) is inputted to the multiplier 2A. Further, the phase/amplitude control circuit 3 effects control such that the selector 6B selects the I channel input signal by the selection signal Isel2. Due thereto, cos (θ+ζ) is inputted to the multiplier 2B.

Moreover, in a case in which phase angle θ is notified from the subsequent circuit 20, the phase/amplitude control circuit 3 sets the first coefficient to the value of sin ζ and outputs the output signal Coef1 expressing the first coefficient to the input of the multiplier 2A. Due thereto, multiplication of sin ζ and sin(θ+δ) is carried out at the multiplier 2A, and the multiplication result sin(θ+δ)sin ζ is outputted from the multiplier 2A and inputted to the adder 4A.

Accordingly, addition of the multiplication result sin(θ+δ)sin ζ and the I channel input signal cos(θ+ζ) is carried out at the adder 4A, and the addition result {cos(θ+ζ)+sin (θ+δ)sin ζ} is outputted from the output terminal 8A. The correction signal outputted from the output terminal 8A is the cosine waveform cos θ expressed by formula (15), i.e., is the corrected I channel input signal that is corrected such that the phase angle (θ+ζ) of the I channel input signal becomes the phase angle θ designated by the subsequent circuit 20.

Moreover, the phase/amplitude control circuit 3 sets the second coefficient to the value "−sin δ", and outputs the output signal Coef2 expressing the second coefficient to the input of the multiplier 2B. Due thereto, multiplication of "−sin δ" and cos(θ+ζ) is carried out at the multiplier 2B, and the multiplication result "−cos(θ+ζ)sin δ" is outputted from the multiplier 2B and inputted to the adder 4B.

Accordingly, addition of the multiplication result "−cos (θ+ζ)sin δ" and the Q channel input signal sin(θ+δ) is carried out at the adder 4B, and the addition result {sin(θ+δ)−cos (θ+ζ)sin δ} is outputted from the output terminal 8B. The correction signal outputted from the output terminal 8B is the sine waveform sin θ expressed by formula (16), i.e., is the corrected Q channel input signal that is corrected such that the phase angle (θ+δ) of the Q channel input signal becomes the phase angle θ designated by the subsequent circuit 20.

Note that the phase angles ζ, δ that are used as the first coefficient and the second coefficient may be stored in the phase/amplitude control circuit 3 in advance. Or, as illustrated in FIG. 2, the output signals of the adders 4A, 4B may be fed-back to the phase/amplitude control circuit 3, and the phase angles ζ, δ may be detected at the phase/amplitude control circuit 3 from the output signals of the adders 4A, 4B and the designated phase angle θ.

In this way, by using the correction circuit 10 relating to the present embodiment, the amplitudes and the phase angles of both the I channel input signal and the Q channel input signal may be corrected to target values that are designated.

Note that the technical scope of the present disclosure is not limited to the scope disclosed in the above-described embodiments. Various modifications and improvements can be made to the above-described embodiments within a scope that does not depart from the gist of the present invention, and forms to which such modifications and improvements have been made also are included in the technical scope of the present disclosure.

What is claimed is:

1. A correction circuit comprising:
a first selector and a second selector that each select and output either of a first input signal or a second input signal, the first input signal and the second input signal having phases that are orthogonal to one another;
a first multiplier carrying out multiplication of an output of the first selector and a first coefficient;
a second multiplier carrying out multiplication of an output of the second selector and a second coefficient;
a first adder carrying out addition of the first input signal and a multiplication result of the first multiplier; and
a second adder carrying out addition of the second input signal and a multiplication result of the second multiplier,
wherein an addition result of the first adder and an addition result of the second adder are outputted from a first output terminal and a second output terminal, respectively.

2. The correction circuit of claim 1, wherein:
in a case in which the first input signal is expressed by cosine waveform $A \cos(\theta+\alpha)$ having amplitude A and phase angle $(\theta+\alpha)$, and the second input signal is expressed by sine waveform $B \sin \theta$ having amplitude B and phase angle $\theta$, the first selector and the second selector both select the second input signal, and
the first coefficient is set to $(A/B)\sin \alpha$, and the second coefficient is set to $(A/B-1)$.

3. The correction circuit of claim 1, wherein:
in a case in which the first input signal is expressed by cosine waveform $A \cos \theta$ having amplitude A and phase angle $\theta$, and the second input signal is expressed by sine waveform $B \sin(\theta+\alpha)$ having amplitude B and phase angle $(\theta+\alpha)$, the first selector and the second selector both select the first input signal, and
the first coefficient is set to $(B/A-1)$, and the second coefficient is set to $-(B/A)\sin \alpha$.

4. The correction circuit of claim 2, wherein the first coefficient and the second coefficient are set by using amplitude A of the first input signal, amplitude B of the second input signal, and phase angle $\alpha$, which are calculated from the addition result of the first adder and the addition result of the second adder in a case in which the first coefficient and the second coefficient are respectively set to be 0 in advance.

5. The correction circuit of claim 1, wherein:
in a case in which the first input signal is expressed by cosine waveform $A \cos \theta$ having amplitude A and phase angle $\theta$, and the second input signal is expressed by sine waveform $B \sin \theta$ having amplitude B and phase angle $\theta$, the first selector selects the first input signal, and the second selector selects the second input signal, and
the first coefficient is set to $(C/A-1)$, which is calculated from amplitude A of the first input signal and amplitude C after correction of the first input signal and the second input signal respectively, and the second coefficient is set to $(C/B-1)$, which is calculated from amplitude B of the second input signal and the amplitude C.

6. The correction circuit of claim 1, wherein:
in a case in which the first input signal is expressed by cosine waveform $\cos(\theta+\zeta)$ having phase angle $(\theta+\zeta)$, and the second input signal is expressed by sine waveform $\sin(\theta+\delta)$ having phase angle $(\theta+\delta)$, the first selector selects the second input signal, and the second selector selects the first input signal, and
the first coefficient is set to be $\sin \zeta$, and the second coefficient is set to be $\sin \delta$.

7. A correction method comprising, by a control circuit:
controlling a first selector and a second selector, and respectively selecting either input signal among a first input signal and a second input signal whose phases are orthogonal to one another;
executing multiplication of a preset first coefficient and an output of the first selector by using a first multiplier, and executing multiplication of a preset second coefficient and an output of the second selector by using a second multiplier; and
outputting a first addition result of the first input signal and a multiplication result of the first multiplier, the first addition result being obtained by using a first adder, and outputting a second addition result of the second input signal and a multiplication result of the second multiplier, the second addition result being obtained by using a second adder, as a correction signal of the first input signal and a correction signal of the second input signal, respectively.

* * * * *